US010897325B2

(12) United States Patent
Hwang et al.

(10) Patent No.: US 10,897,325 B2
(45) Date of Patent: Jan. 19, 2021

(54) METHOD FOR RETRANSMITTING PUNCTURED DATA AND DEVICE THEREFOR

(71) Applicant: LG ELECTRONICS INC., Seoul (KR)

(72) Inventors: Daesung Hwang, Seoul (KR); Ilmu Byun, Seoul (KR); Yunjung Yi, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/475,884

(22) PCT Filed: Jan. 3, 2018

(86) PCT No.: PCT/KR2018/000071
§ 371 (c)(1),
(2) Date: Jul. 3, 2019

(87) PCT Pub. No.: WO2018/128363
PCT Pub. Date: Jul. 12, 2018

(65) Prior Publication Data
US 2019/0379487 A1 Dec. 12, 2019

Related U.S. Application Data

(60) Provisional application No. 62/441,932, filed on Jan. 3, 2017, provisional application No. 62/486,985, filed
(Continued)

(51) Int. Cl.
*H04W 4/00* (2018.01)
*H04L 1/00* (2006.01)
(Continued)

(52) U.S. Cl.
CPC .......... *H04L 1/0068* (2013.01); *H04L 1/0047* (2013.01); *H04L 1/0061* (2013.01);
(Continued)

(58) Field of Classification Search
None
See application file for complete search history.

(56) References Cited

U.S. PATENT DOCUMENTS 9,320,043 B2 4/2016 Lee et al.
2011/0317637 A1 12/2011 Kim et al.
(Continued)

FOREIGN PATENT DOCUMENTS

EP 2048807 4/2009
JP 2015530796 10/2015
(Continued)

OTHER PUBLICATIONS

Translation of kr101577437 from IDS received on Oct. 3, 2019 (Year: 2015).*
(Continued)

*Primary Examiner* — Clemence S Han
(74) *Attorney, Agent, or Firm* — Lee Hong Degerman Kang Waimey

(57) ABSTRACT

A method by which a terminal receives data through a plurality of layers of a base station in a wireless communication system is disclosed. Particularly, the method comprises the steps of: receiving, from the base station, the data, which was divided into a plurality of first code blocks, and a particular downlink control indicator (DCI) for the data; and receiving, from the base station, a plurality of second code blocks according to the particular DCI, wherein all of the plurality of second code blocks are received through the same layer.

13 Claims, 10 Drawing Sheets

Related U.S. Application Data on Apr. 19, 2017, provisional application No. 62/539,488, filed on Jul. 31, 2017.

(51) Int. Cl.
*H04L 1/18* (2006.01)
*H04L 5/00* (2006.01)
*H04W 72/04* (2009.01)

(52) U.S. Cl.
CPC .......... *H04L 1/1819* (2013.01); *H04L 5/0055* (2013.01); *H04W 72/042* (2013.01)

(56) References Cited

U.S. PATENT DOCUMENTS

| | | | | |
|---|---|---|---|---|
| 2012/0014328 | A1 | 1/2012 | Göransson et al. | |
| 2012/0207111 | A1* | 8/2012 | Jang | H04L 1/0073 370/329 |
| 2013/0229972 | A1* | 9/2013 | Lee | H04L 5/0044 370/312 |
| 2014/0153519 | A1* | 6/2014 | Wengerter | H04L 1/0026 370/329 |
| 2016/0226643 | A1* | 8/2016 | Mallik | H04L 1/1819 |
| 2017/0230994 | A1* | 8/2017 | You | H04L 5/0053 |
| 2017/0310431 | A1* | 10/2017 | Iyer | H04L 1/1816 |
| 2017/0366199 | A1* | 12/2017 | Ge | G06F 11/1004 |
| 2018/0167931 | A1* | 6/2018 | Papasakellariou | H04L 1/1854 |
| 2019/0068318 | A1* | 2/2019 | Marinier | H04L 1/004 |
| 2019/0191487 | A1* | 6/2019 | Kwon | H04L 1/00 |

FOREIGN PATENT DOCUMENTS

| | | |
|---|---|---|
| KR | 1020130029458 | 3/2013 |
| KR | 101577437 | 12/2015 |
| WO | 2016126330 | 8/2016 |

OTHER PUBLICATIONS

PCT International Application No. PCT/KR2018/000071, Written Opinion of the International Searching Authority dated Apr. 27, 2018, 24 pages.

European Patent Office Application Serial No. 18736248.8, Search Report dated Jul. 23, 2020, 10 pages.

Intel Corporation, "Downlink URLLC transmission and multiplexing with eMBB", R1-1612003, 3GPP TSG RAN WG1 Meeting #87, Nov. 2016, 9 pages.

LG Electronics, "On multiplexing between eMBB and URLLC", R1-1611849, 3GPP TSG RAN WG1 Meeting #87, Nov. 2016, 12 pages.

ZTE et al., "Multiplexing of eMBB and URLLC", R1-166408, 3GPP TSG RAN WG1 Meeting #86, Aug. 2016, 10 pages.

MediaTek Inc., "URLLC and eMBB DL Multiplexing using CRC", R1-1612149, 3GPP TSG RAN WG1 Meeting #87, Nov. 2016, 6 pages.

Japan Patent Office Application No. 2019-556780, Office Action dated Sep. 29, 2020, 2 pages.

InterDigital Communications, "On multiplexing of eMBB and URLLC data", R1-1612646, 3GPP TSG RAN WG1 Meeting #87, Nov. 2016, 6 pages.

Sony, "Dynamic Resource Sharing for eMBB/URLLC in DL", R1-1613047, 3GPP TSG RAN WG1 Meeting #87, Nov. 2016, 5 pages.

LG Electronics, "Considerations on channel coding chain for eMBB", R1-1611855, 3GPP TSG RAN WG1 Meeting #87 Nov. 2016, 3 pages.

\* cited by examiner

FIG. 2
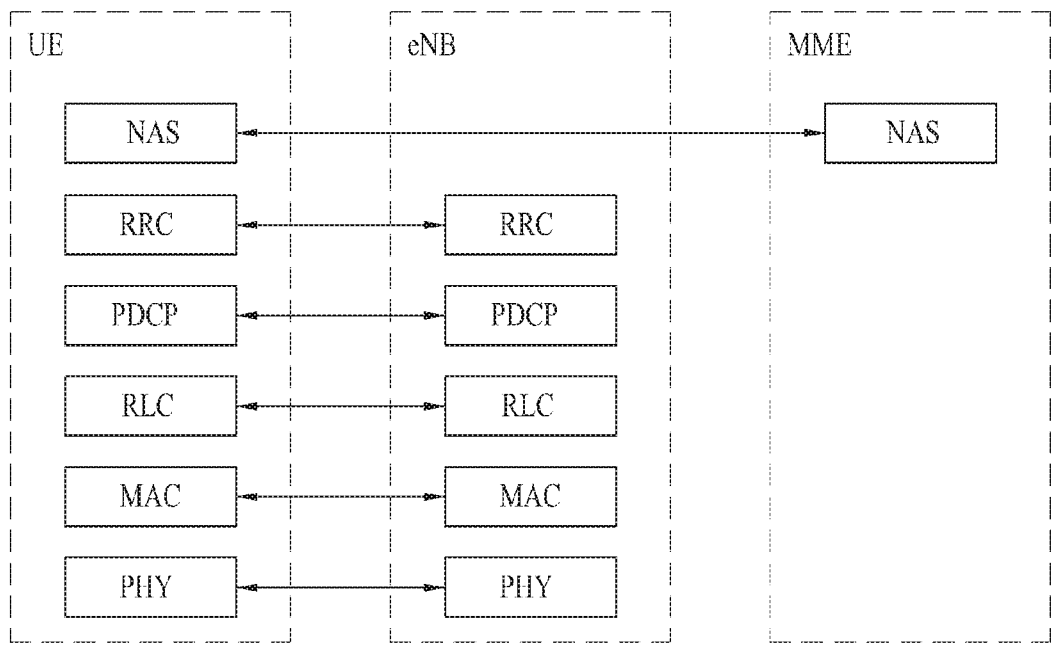
(A) CONTROL-PLANE PROTOCOL STACK
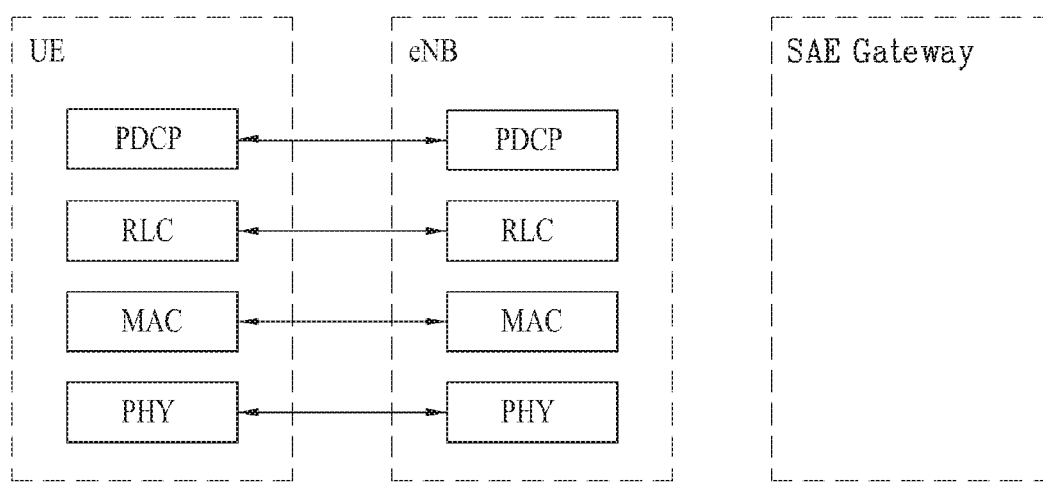
(B) USER-PLANE PROTOCOL STACK (A)  (B)

METHOD FOR RETRANSMITTING PUNCTURED DATA AND DEVICE THEREFOR

CROSS-REFERENCE TO RELATED APPLICATIONS

This application is the National Stage filing under 35 U.S.C. 371 of International Application No. PCT/KR2018/000071, filed on Jan. 3, 2018, which claims the benefit of U.S. Provisional Application No. 62/441,932, filed on Jan. 3, 2017, 62/486,985, filed on Apr. 19, 2017, and 62/539,488, filed on Jul. 31, 2017, the contents of which are all hereby incorporated by reference herein in their entireties.

TECHNICAL FIELD

The present invention relates to a method for retransmitting punctured data and a device therefor, and more particularly, to a method for retransmitting punctured data and by transmitting ACK/NACK signal for the punctured data in a code block level and a device therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

An object of the present invention is to provide a method for retransmitting punctured data and a device therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

In a wireless communication system according to the embodiment of the present invention, a method for receiving data in a user equipment (UE) through a plurality of layers of a base station in a wireless communication system comprises the steps of receiving, from the base station, the data, which are divided into a plurality of first code blocks, and a specific downlink control indicator (DCI) for the data, and receiving, from the base station, a plurality of second code blocks in accordance with the specific DCI, wherein all of the plurality of second code blocks are received through the same layer.

At this time, the same layer may be selected based on a channel state of each of the plurality of layers.

Also, the plurality of second code blocks may be received based on response signals to each of the plurality of first code blocks transmitted in accordance with the specific DCI, and may correspond to the plurality of first code blocks having NACK as the response signal.

Also, if the number of the response signals having NACK is a threshold value or less, DCI including code block based scheduling information may be monitored from the time when the response signals are transmitted.

Also, the specific DCI may include puncturing information of a specific time domain, and the plurality of second code blocks may correspond to at least one first code block of which at least a portion is included in the specific time domain.

Also, the puncturing information of the specific time domain may include a start position and time duration information, which are punctured, of the specific time domain.

Also, the data may be decoded based on only the plurality of second code blocks.

Also, data different from the data may be received through the other layers except the same data among the plurality of layers.

Also, the plurality of first code blocks may be received in a transport block level including at least one of the plurality of first code blocks.

Also, values of redundancy versions of each of the plurality of first code blocks and each of the plurality of second code blocks may be set independently from each other.

Also, the plurality of first code blocks and the plurality of second code blocks are related to the same data.

In a UE for receiving data through a plurality of layers of a base station in a wireless communication system according to the present invention, the UE comprises a radio frequency (RF) module for transmitting and receiving signals to and from the base station; and a processor connected with the RF module, receiving the data, which are divided into a plurality of first code blocks, and a specific downlink control indicator (DCI) for the data, and receiving a plurality of second code blocks in accordance with the specific DCI, wherein all of the plurality of second code blocks may be received through the same layer.

At this time, the same layer may be selected based on a channel state of each of the plurality of layers.

Also, values of redundancy versions of each of the plurality of first code blocks and each of the plurality of second code blocks may be set independently from each other.

Also, the specific DCI may include puncturing information of a specific time domain, and the plurality of second code blocks may correspond to at least one first code block of which at least a portion is included in the specific time domain.

Advantageous Effects

According to the present invention, retransmission and decoding may efficiently be performed even in the case that data loss occurs in some of physical channels operating in a slot level due to puncturing or interference.

BRIEF DESCRIPTION OF THE DRAWINGS

FIG. 2 is a diagram illustrating structures of a control plane and a user plane of a radio interface protocol between a UE and an E-UTRAN based on the 3GPP radio access network specification.

BEST MODE FOR CARRYING OUT THE INVENTION

Figure 1:
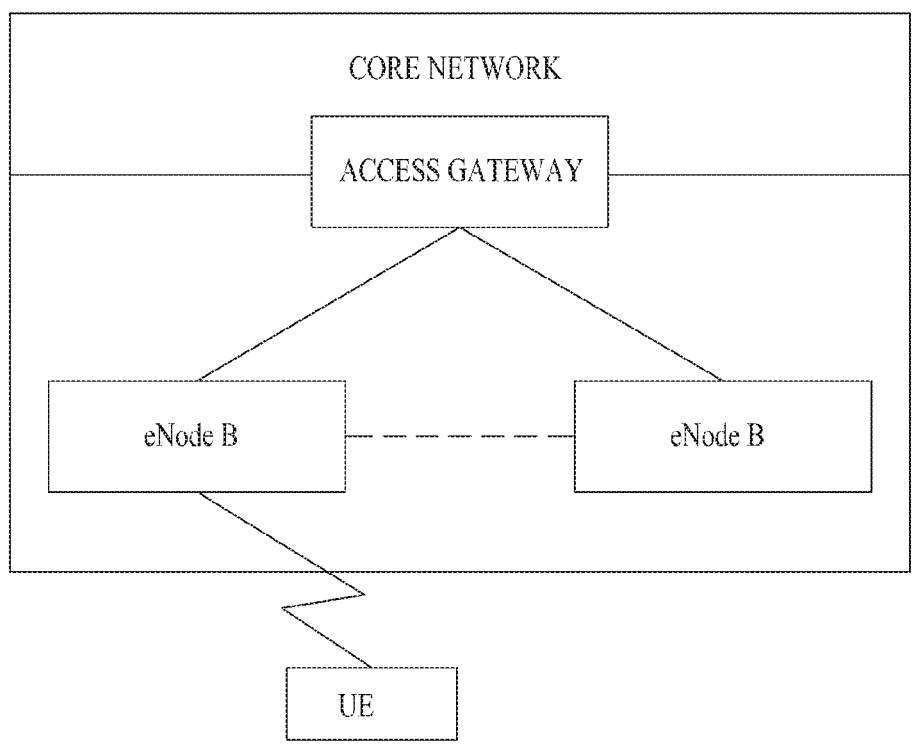
FIG. 1 is a diagram schematically illustrating a network structure of an E-UMTS as an exemplary radio communication system.

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition.

In the present disclosure, a base station (eNB) may be used as a broad meaning including a remote radio head (RRH), an eNB, a transmission point (TP), a reception point (RP), a relay, etc.

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel Data is transported between the MAC layer and the physical layer via the transport channel Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
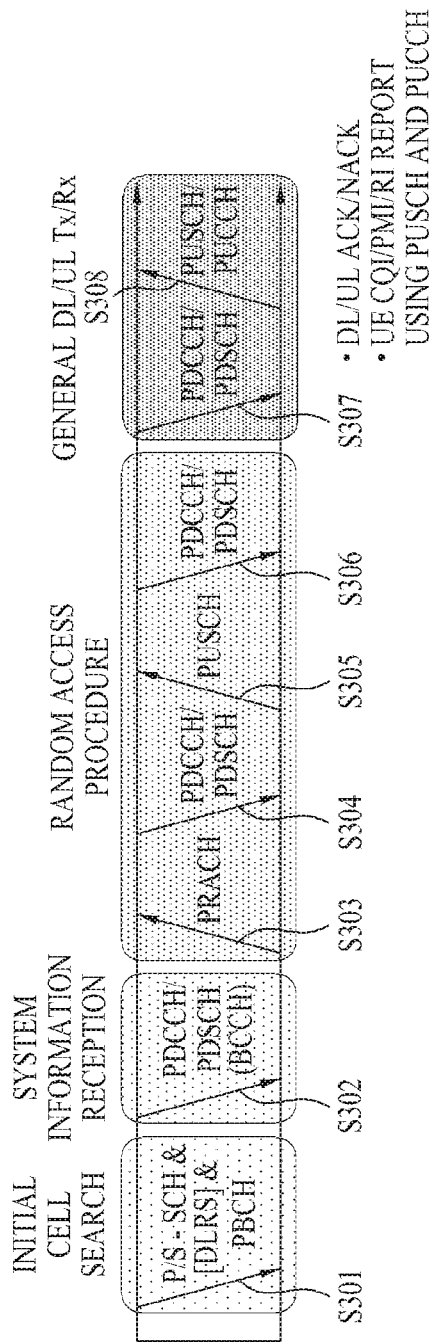
FIG. 3 is a diagram illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
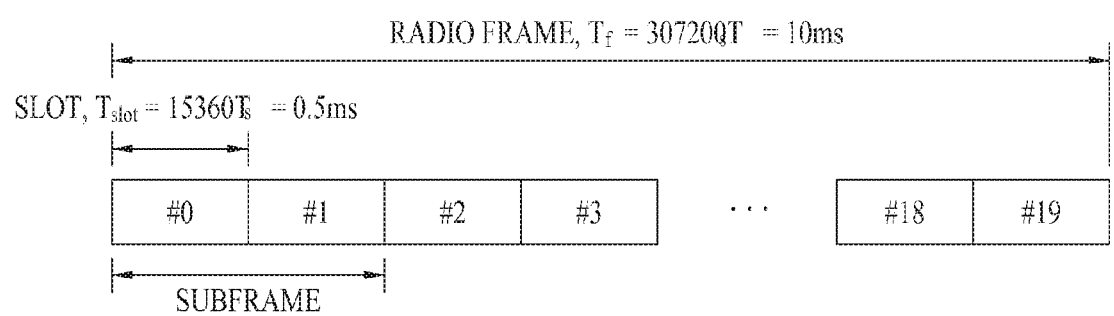
FIG. 4 is a diagram illustrating the structure of a radio frame used in an LTE system.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by Ts=1/(15 kHz×2048)=3.2552×10−8 (about 33 ns). Each slot includes a plurality of OFDM symbols in a time domain and includes a plurality of Resource Blocks (RBs) in a frequency domain. In the LTE system, one resource block includes 12 subcarriers×7 (or 6) 01-DM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
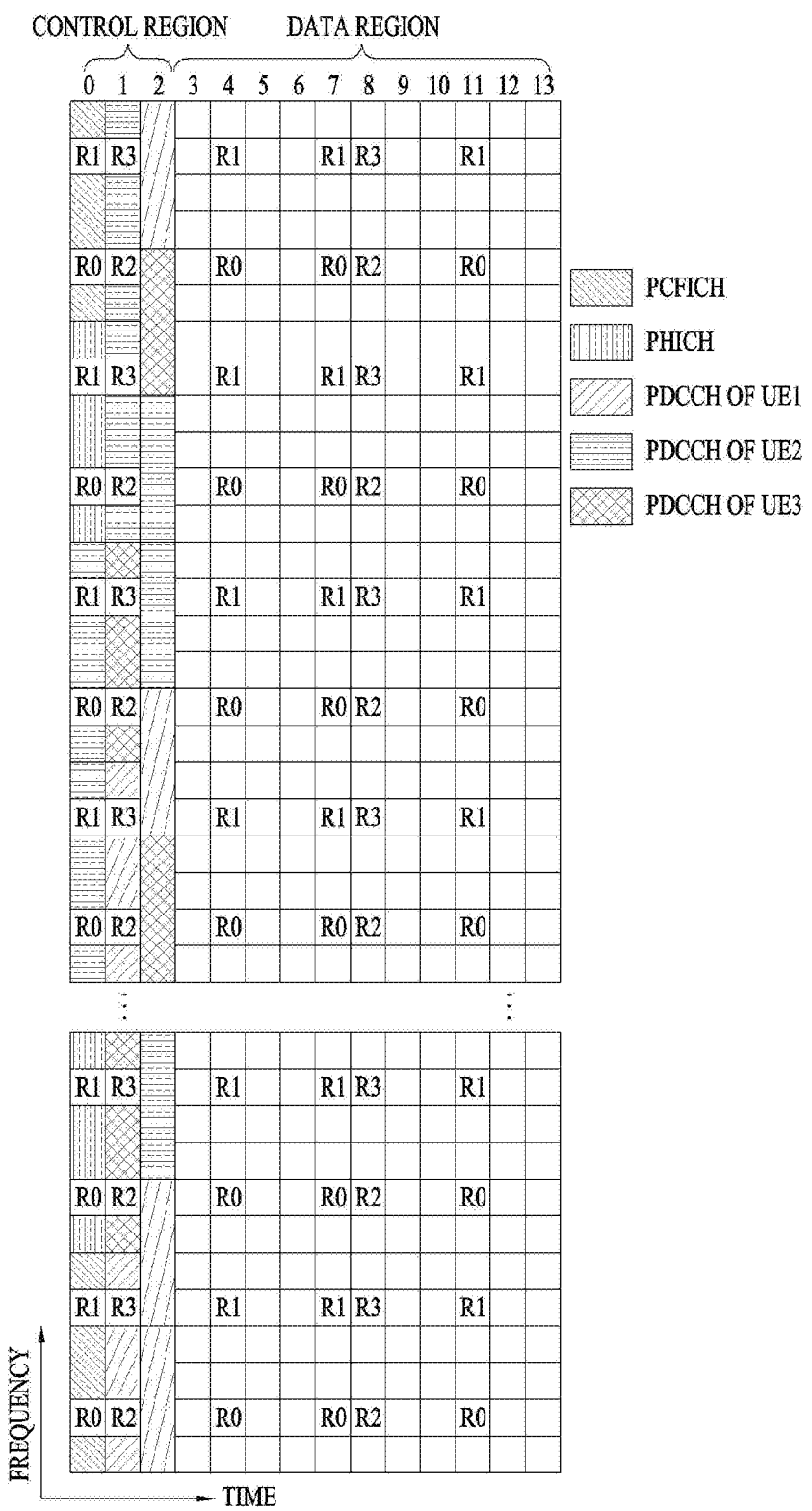
FIG. 5 is a diagram illustrating the structure of a DL radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
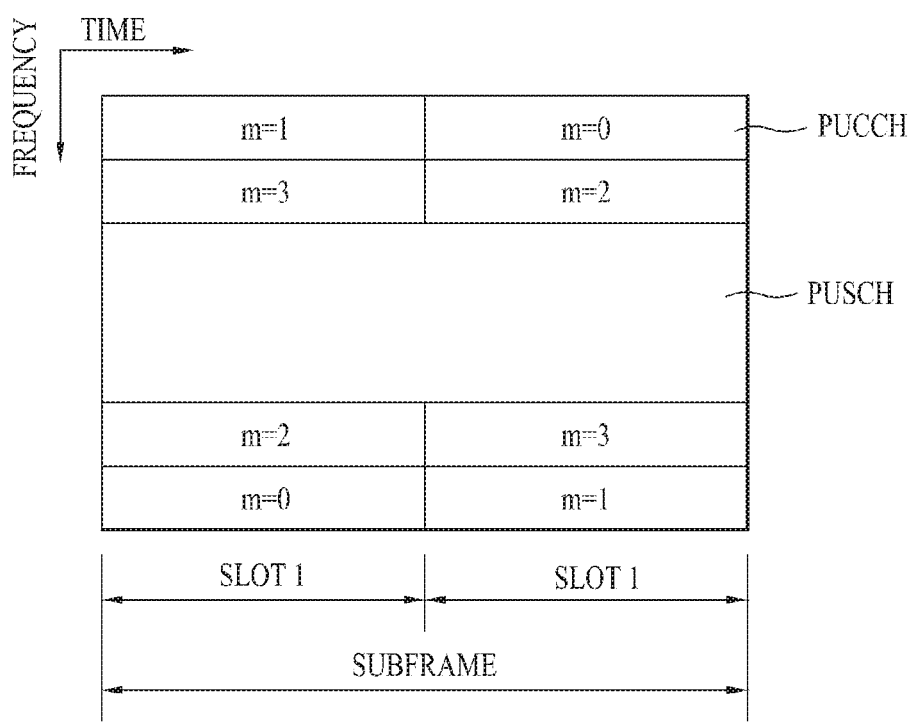
FIG. 6 is a diagram illustrating the structure of a UL subframe in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may perform beamforming based on CSI in order to obtain multiplexing gain of MIMO antennas. To acquire CSI from the UE, the eNB allocates a PUCCH or a PUSCH to the UE and commands the UE to feed back CSI regarding a DL signal.

CSI is divided into three types of information: an RI, a PMI, and a CQI. First, RI is information on a channel rank as described above and indicates the number of streams that may be received by the UE via the same time-frequency resource. Since RI is determined by long-term fading of a channel, RI may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

In a 3GPP LTE-A system, the eNB may configure a plurality of CSI processes for the UE and receive report for CSI regarding each CSI process. Herein the CSI process includes a CSI-RS resource for measuring quality of a signal received from the eNB and a CSI-interference measurement (CSI-IM) resource for measuring interference, i.e., an interference measurement resource (IMR).

In a millimeter wave (mmW) band, wavelength is shortened, and thus a plurality of antenna elements may be installed in the same area. Specifically, a total of 64 (=8×8) antenna elements may be installed in a 4-by-4 cm panel in a 30 GHz band with a wavelength of about 1 cm in a 2-dimensional array at intervals of 0.5λ (wavelength). Therefore, in mmW, increasing coverage or throughput by increasing beamforming (BF) gain using multiple antenna elements has recently been taken into consideration.

If a transceiver unit (TXRU) is provided for each antenna element to enable adjustment of transmit power and phase, independent BF is possible for each frequency resource. However, installing TXRU in all of the about 100 antenna elements is less feasible in terms of cost. Therefore, a method of mapping multiple antenna elements to one TXRU and adjusting the direction of a beam using an analog phase shifter is under consideration. This analog BF method may make only one beam direction in the whole band, and thus may not perform frequency selective BF, which is disadvantageous.

Hybrid BF using B TXRUs less in number than Q antenna elements may be considered as an intermediate type of digital BF and analog BF. In this case, the number of beam directions in which beams may be transmitted at the same time is limited to B or less, which depends on a connection method of B TXRUs and Q antenna elements.

Figure 7:
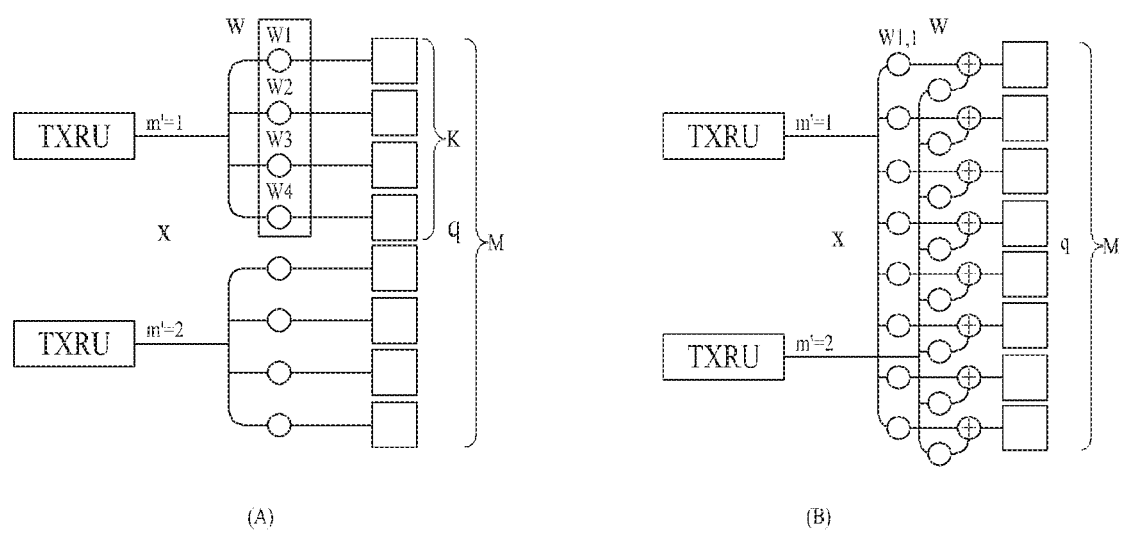
FIG. 7 illustrates examples of a connection mode of TXRU and an antenna element.

FIG. 7 illustrates exemplary connection schemes between TXRUs and antenna elements.

(a) of FIG. 7 illustrates connection between a TXRU and a sub-array. In this case, an antenna element is connected only to one TXRU. In contrast, (b) of FIG. 7 illustrates connection between a TXRU and all antenna elements. In this case, an antenna element is connected to all TXRUs. In FIG. 7, W represents a phase vector subjected to multiplication in an analog phase shifter. That is, a direction of analog BF is determined by W. Herein, CSI-RS antenna ports may be mapped to TXRUs in a one-to-one or one-to-many correspondence.

As more communication devices have demanded higher communication capacity, there has been necessity of enhanced radio broadband communication relative to legacy radio access technology (RAT). In addition, massive machine type communication (MTC) for providing various services anytime and anywhere by connecting a plurality of devices and objects to each other is also one main issue to be considered in next-generation communication. Further, a communication system to be designed in consideration of services/UEs sensitive to reliability and latency is under discussion. Thus, introduction of next-generation RAT has been discussed by taking into consideration such matters. In the present invention, the above technology is referred to as NewRAT for convenience of description.

Figure 8:
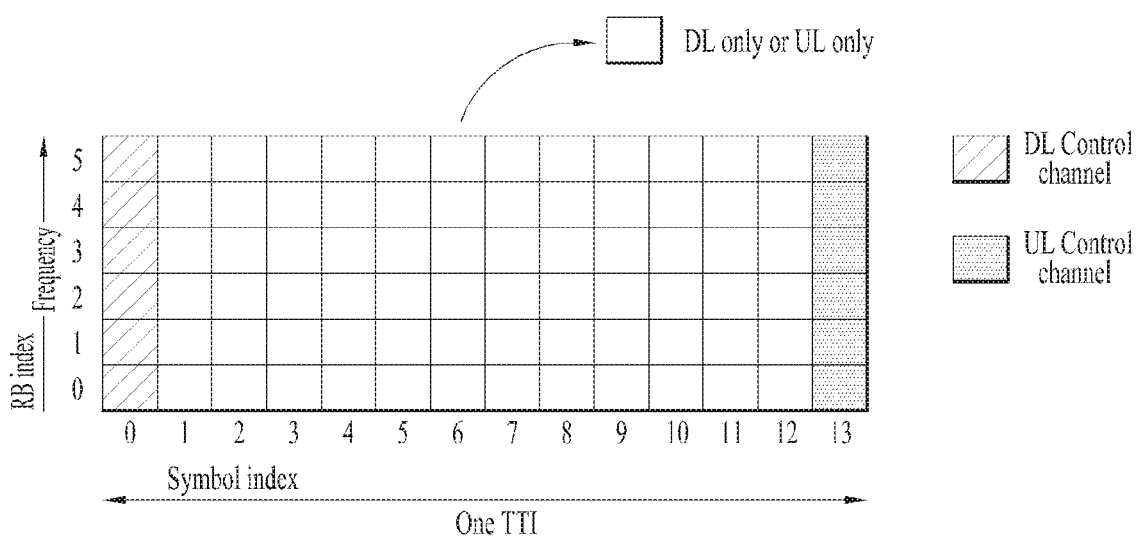
FIG. 8 is an example of a self-contained subframe structure.

To minimize data transmission latency in a time division duplex (TDD) system, the structure of a self-contained subframe as illustrated in FIG. 8 is considered in fifth-generation (5G) NewRAT. FIG. 8 illustrates the structure of an exemplary self-contained subframe.

In FIG. 8, the hatched area represents a DL control region and the black area represents a UL control region. The area having no marks may be used for either DL data transmission or UL data transmission. In this structure, DL transmission and UL transmission may be sequentially performed in one subframe to send DL data and receive UL ACK/NACK therefor in a subframe. As a result, this structure may reduce time taken to retransmit data when a data transmission error occurs, thereby minimizing the latency of final data transmission.

In such a self-contained subframe structure, a time gap is required in order for the eNB and the UE to switch from a transmission mode to a reception mode or from the reception mode to the transmission mode. To this end, some OFDM symbols at the time of switching from DL to UL in the subframe structure may be set as a guard period (GP).

Examples of the self-contained subframe type that may be configured/set in the system operating based on NewRAT may consider at least four subframe types as follows.

DL control period+DL data period+GP+UL control period

DL control period+DL data period

DL control period+GP+UL data period+UL control period

DL control period+GP+UL data period

In the 5G NewRAT system, various reference time units used to transmit and receive physical channels may exist in accordance with an application field or a type of traffic. The reference time may be a basic unit for scheduling a specific physical channel, and a reference time unit may be varied depending on the number of symbols constituting a corresponding scheduling unit and/or a subcarrier spacing.

In the embodiment of the present invention, it is assumed that a reference time unit is a slot and a mini-slot for convenience of description. The slot may be a basic unit of scheduling used for general data traffic like data transmitted from eMBB (enhanced mobile broadband). The mini-slot has a time duration smaller than a slot in a time domain, and may be a basic unit of scheduling used in traffic or communication mode for a specific purpose (e.g., URLLC (Ultra reliable and low latency communication)), non-licensed band or millimeter wave.

However, this is only an embodiment for convenience of description, and it will be apparent that the aforementioned description can be extended from the spirits of the present invention even in the case that eMBB transmits and receives physical channels based on the mini-slot or URLLC or another communication scheme transmits and receives physical channels based on slot.

In slot based transmission (hereinafter, eMBB transmission), transmission may occur for a relatively long time as compared with a relatively mini-slot based transmission (hereinafter, URLLC). In case of URLLC traffic, it is general that an urgent packet may occur suddenly, especially URLLC traffic may occur in the middle of eMBB transmission.

Generally, eMBB transmission may be scheduled in a slot level, and therefore an impact of URLLC generated in the middle of eMBB transmission may not be recognized immediately like the case that some of eMBB transmission resources are punctured during URLLC physical channel transmission.

Under the circumstances, a UE which receives eMBB physical channel may perform data decoding based on wrong information due to puncturing due to URLLC. This may cause degradation of decoding performance even in case of retransmission. For example, if chase combining is performed using a soft value of previous transmission, decoding performance may be degraded, and in this case, excessive retransmission may be required.

If the UE may recognize punctured resources by another information, it is possible to attenuate degradation of decoding performance by excluding a soft value corresponding to the punctured resources. That is, an input value such as LLR (log-likelihood ratio) may be set to 0 and then decoding may be performed, whereby degradation of decoding performance may be attenuated.

Based on the above description, the present invention suggests a method for efficiently multiplexing physical channels transmitted at their respective time units different from each other when transmission and reception are performed in a plurality of reference time units such as subframe, slot or mini-slot. Also, the present invention suggests a method for allowing a UE to recognize a status that some transmission resources of a specific physical channel transmitted based on a slot are lost by another physical channel transmitted based on a mini-slot or attenuation of some transmission resources occurs and/or a method for enhancing reception performance based on corresponding information.

Indication Method for Punctured Resources

If URLLC traffic occurs in the middle of transmitting the physical channel for eMBB, some of resources allocated to the eMBB physical channel, which is being transmitted, may be punctured in accordance with available resources and the amount of URLLC traffic, whereby the URLLC physical channel may be transmitted. At this time, if the UE performs detection and decoding of the eMBB physical channel, detection and/or decoding performance may be reduced by a puncturing resource region replaced with the URLLC physical channel Therefore, if the UE performs decoding, the UE needs to exclude the punctured resource region, and indication information on the punctured resource region may be required to be transmitted to the UE.

In the 5G NewRAT, it is considered that time/frequency domain position information on the resources punctured by URLLC, etc. or resources replaced with other information is transmitted through a third physical channel. The third physical channel may be transmitted in a code block (CB) level or a level of single or a plurality of mini-slots within a slot, or may be transmitted through the last several symbols of the slot. For example, the physical channel that includes the punctured resource information may be transmitted based on the same numerology as that of the eMBB. At this time, the same numerology may be a specific symbol group on a slot basis. In this case, the punctured resource information may include information as to whether some of the resources have been punctured in a specific slot. This information may be information indicating whether some of the resources for all physical channels have been punctured, or indicating the presence of punctured resources per code block or mini-slot.

Meanwhile, if the UE successfully receives the physical channel, a soft value for all or some of eMBB data including the punctured resources may be flushed from a buffer. In this case, the soft value flushed from the buffer may be a soft value for code blocks including the punctured resources. That is, if decoding is performed after retransmission for eMBB data, decoding may be performed using only a value received for retransmission instead of performing chase combining.

For example, in case of a code block having no punctured resources in previous transmission, chase combining may be performed in accordance with an indication value. In case of a code block having punctured resources in previous transmission, chase combining may not be performed in accordance with an indication value. Indication information on the punctured resources may specify a code block for retransmission when retransmission corresponding to a corresponding HARQ process later occurs. For example, when retransmission for the same HARQ process is scheduled, a code block for retransmission may correspond to the punctured resources indicated by the indication information, or may be limited to a code block partially overlapped with the punctured resources.

Meanwhile, a method for indicating whether to deliver information on the punctured resources to the UE or perform chase combining or performing decoding using information retransmitted after all of some of buffer information is reset, through retransmission DCI may be considered. For example, in the same manner as a retransmission status according to a channel state and an interference status, retransmission DCI (hereinafter, first DCI) for a general retransmission status and retransmission DCI (hereinafter, second DCI) for a retransmission status according to a case that some resources are punctured by URLLC may be identified from each other.

In detail, the UE which has received the second DCI may not perform chase combining for all or some of code blocks during decoding if the second DCI, although related to retransmission, is retransmission DCI according to the case that some resources are punctured. At this time, the first DCI and the second DCI may be identified by a specific indicator, or may be identified by scrambling and/or CRC masking. For example, when decoding PDSCH indicated by the DCI by an indicator in the DCI or scrambling and/or CRC masking, the UE may determine whether to perform decoding after performing chase combining for the soft value of previous transmission corresponding to the PDSCH decoding or determine whether to perform decoding using PDSCH retransmitted after resetting the soft value of previous transmission corresponding to the decoding.

Figure 9:
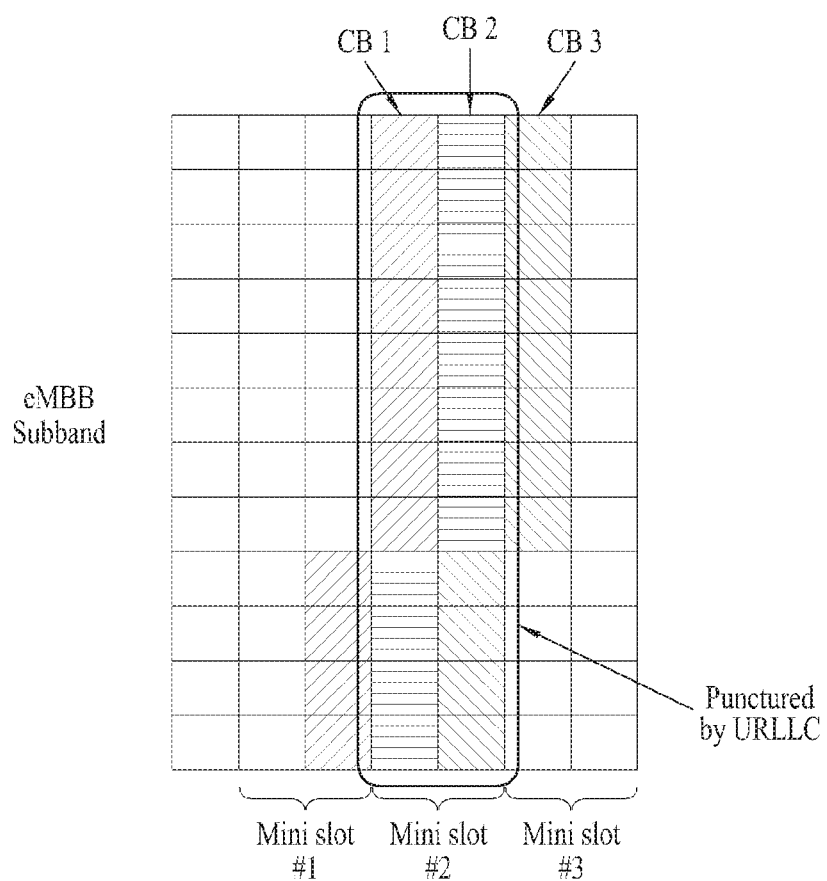
FIG. 9 is a diagram illustrating a method for retransmitting punctured data in accordance with one embodiment of the present invention.

At this time, whether to indicate and perform the chase combining may be performed for a single code block or a plurality of code blocks. If the indication information is transmitted to the UE in a level of a single mini-slot or a plurality of mini-slots, chase combining may not be performed for all or some of the code blocks overlapped with the corresponding mini-slot. For example, if an area corresponding to mini-slot 2 is punctured in FIG. 9, the base station indicates that mini-slot 2 has been punctured in the second DCI. Then, the UE may identify that code block 1, code block 2 and code block 3 have been retransmitted from the second DCI. Meanwhile, the mini-slot may be set regardless of the area to which URLLC is actually transmitted, or may be expressed as a start position of the mini-slot and/or time duration information of the mini-slot.

Meanwhile, the second DCI may be set by combining HARQ process number (or HARQ process ID), NDI and/or the time when the second DCI is transmitted. In the above case, HARQ process number (or HARQ process ID) and/or NDI may be set for each transport block (TB), or may be set for a single code block or a plurality of code blocks.

A detailed embodiment of a method for configuring retransmission DCI without performing chase combining for all or some of code blocks will be described. At this time, the HARQ process number (or HARQ process ID) may be set in the same manner as previous transmission. Meanwhile, the retransmission DCI described in the following embodiment may be retransmission DCI for a retransmission status according to the case that some resources are punctured, that is, the second DCI.

1. Embodiment 1

NDI of retransmission DCI is set to a value indicating retransmission. That is, NDI may not be toggled from a previous NDI which is NDI of DCI having the same HARQ process ID. Alternatively, the retransmission DCI may be transmitted based on a DCI transmission timing for previous transmission. In detail, the retransmission DCI may be transmitted 1) after previous transmission DCI corresponding to the retransmission DCI is transmitted, 2) after PDSCH corresponding to previous DCI is transmitted, or 3) before HARQ-ACK for PDSCH corresponding to previous DCI is transmitted.

Meanwhile, a transmission interval where the retransmission DCI, which can indicate whether to perform chase combining by NDI, is transmitted may be indicated by previous DCI corresponding to corresponding retransmission. For example, the transmission interval which is indicated may be a processing time and/or HARQ-ACK transmission timing indicated by DCI. Also, the retransmission DCI may be transmitted from next slot of a slot to which previous DCI corresponding to the retransmission DCI is transmitted, or a first downlink or uplink slot next to the slot to which previous DCI is transmitted. Meanwhile, in order to determine chase combining for each code block, NDI may be set for a single code block or a plurality of code blocks.

2. Embodiment 2

NDI of retransmission DCI is set to a value indicating new data. That is, NDI may be toggled from a previous NDI which is NDI of DCI having the same HARQ process ID. For example, if the retransmission DCI is transmitted within a specific time from a DCI transmission timing for previous transmission, chase combining may not be performed for a code block where CRC check is failed. In other words, since the UE will not perform chase combining for a code block where CRC check is successfully performed in previous transmission if CRC check for the retransmitted code block is failed even in case of the code block where CRC check is successfully performed in previous transmission for the same HARQ process ID, the UE may not expect decoding for the code block where CRC check is successfully performed in previous transmission. On the other hand, the transmission interval where the retransmission DCI, which can indicate whether to perform chase combining by NDI, is transmitted may be indicated by previous DCI corresponding to corresponding retransmission. For example, the transmission interval which is indicated may be a processing time and/or HARQ-ACK transmission timing indicated by DCI.

The UE which has received and detected the specific DCI may perform decoding using a received value for PDSCH corresponding to specific DCI without performing chase combining for all or some of the code blocks from PDSCH for previous DCI corresponding to the specific DCI.

A problem may occur in that a large number of code blocks are transmitted unnecessarily like the case that code blocks which are not punctured are retransmitted even in the case that puncturing is performed for a mini-slot duration of a slot duration when a unit indicating punctured resources is great. Also, chase combining may not be performed even for code blocks which are not punctured. To reduce the problem, it may be consider to include information indicating punctured resources and/or information on a retransmission target in DCI for each of one or more code blocks or one or more mini-slots. However, when considering that URLLC traffic is generated intermittently, the above method may be inefficient in view of DCI overhead.

Therefore, as another method, transmission of addition control channel may be considered. For example, information indicating whether there are punctured resources within slot transmission may be transmitted through a first control channel, and additional information transmission for the punctured resources may be considered through a second control channel transmitted just in case that punctured resources exist.

At this time, additional information on the punctured resources may include at least one of a code block index corresponding to the punctured resources, time/frequency resource information and layer information.

Meanwhile, in order to reduce overhead of the second control channel, additional information on the punctured resources may indicate code block index or symbol index where punctured resources are first generated within a slot.

On the other hand, information to be transmitted to the second control channel may previously be notified through the first control channel. For example, if puncturing is generated, the second control channel may indicate information as to whether a control channel including puncturing information per code block or mini-slot is transmitted or information as to whether a retransmission control channel per transport block is transmitted, through the first control channel. This means that different kinds of information is transmitted through the second control channel by identifying the case that puncturing is not generated from the case that puncturing is generated. Therefore, an operation of the UE may be varied depending on information transmitted through the second control channel, that is, depending on indication by the first control channel on information transmitted through the second control channel.

Meanwhile, when the UE fails to receive the first control channel, the UE may perform decoding of the second control channel in accordance with information on the first control channel which is finally received, or may detect the second control channel through blind decoding for the second control channel.

Otherwise, the UE may perform decoding based on a default format for the second control channel, which is set thereto.

On the other hand, if transmission is performed through one control channel without identification of the first control channel and the second control channel, whether indication information for puncturing in a code block level or a mini-slot level is included in DCI may be configured through higher layer signaling. If a network does not support URLLC, it is not required to consider the indication or retransmission method for puncturing as described above. Therefore, if the network does not support URLLC, retransmission of a general transport block level may be considered.

That is, a mode for transmitting retransmission DCI by puncturing may be set to the network, and if the corresponding mode is set, the network may transmit information on puncturing indication of a code block level or a mini-slot level to the UE through the first and second control channels.

Retransmission Method for Recovering Punctured Data

If the UE fails to receive some PDSCH, the UE may expect retransmission for some PDSCH failed in reception, and to enhance retransmission efficiency, may store some PDSCH successfully received for each HARQ process and perform chase combining based on the successfully received PDSCH.

However, a decoding failure due to an actual channel status and an interference status and a decoding failure due to a status that some resources are punctured by URLLC or replaced with other data should be processed differently from each other.

In the present invention, a method for performing retransmission during a decoding failure due to a status that some resources are punctured by URLLC or replaced with other data will be described. In the embodiment according to the present invention, the UE may explicitly or implicitly receive an indication value on the presence of punctured resources from the base station in a level of a single code block or a plurality of code blocks.

Retransmission in the 5G NewRAT may be performed in a transport block level or a code block level, and a redundancy version (RV) value may independently be set in a level of a single code block or a plurality of code blocks. Whether systematic bits or parity bits are transmitted during retransmission may be determined depending on the RV value.

In detail, RV value for code blocks corresponding to the punctured resources or partially overlapped and the other code blocks may be set independently. At this time, the code blocks partially overlapped may mean that a level of resources overlapped with the code blocks overlapped with the punctured resources is a specific threshold value or more or mean that all or some of systematic bits are overlapped.

At this time, in the retransmission DCI, RV value may be set for a single code block or a plurality code blocks. Also, in the retransmission DCI, the RV value may be designated for each of transport block or codeword, or one RV value per DCI may be designated. In this case, a specific code block group may be transmitted in accordance with an indicated RV value, and another specific code block group may be designated as a default RV value regardless of the indicated RV value.

Meanwhile, whether a corresponding code block group is the code block group to which the indicated RV value is applied may be indicated by DCI corresponding to the code block group, or may be indicated through a third channel that includes punctured resource information. In detail, the code block group corresponding to the punctured resources may be configured such that the RV value is set to 0 during retransmission or may be configured to necessarily include systematic bits, and the code block group retransmitted by the other factors, for example, channel status or interference may enhance retransmission efficiency through increase redundancy (IR) method by applying a variable RV value which is set.

Meanwhile, according to another embodiment of the present invention, retransmission based on the code block group may be performed through a plurality of DCIs with respect to one transport block. For example, one DCI may be used to schedule a code block or code block group overlapped with the punctured resources, and the other DCI may be used to schedule the code block group retransmitted by the other factors. According to the aforementioned embodiments, the retransmission code block groups for one transport block may have their respective RV values different from each other.

Basically, PDSCH transmitted through each DCI may be transmitted using different resources, and may include a code block group indicated by each DCI. Also, the PDSCH indicated by a plurality of DCIs for retransmitting one transport block may be overlapped with all or some resources in accordance with network configuration. In this case, only PDSCH indicated by specific DCI may be transmitted. That is, only a code block group indicated by the specific DCI may be retransmitted. At this time, the specific DCI may be determined based on the time when DCI is transmitted and/or resource information of PDSCH indicated by DCI. For example, the specific DCI may be determined based on DCI transmitted later and/or resource amount or resource position of PDSCH indicated by DCI.

On the other hand, the PDSCH may be transmitted based on the information indicated by a plurality of DCIs. In this case, code block groups indicated by the plurality of DCIs may be grouped and then transmitted through one PDSCH. At this time, a mapping order for the plurality of code block groups may be determined based on 1) a code block index within a specific transport block, 2) a temporal order of each DCI, or 3) the lowest code block group index indicated by each DCI. In this case, decoding for PDSCH may be failed or blind decoding for PDSCH may be required in accordance with PDCCH missing.

Meanwhile, each of the plurality of DCIs for one transport block may include HARQ-ACK feedback information, and the UE may transmit HARQ-ACK feedback based on the HARQ-ACK feedback information. For example, the UE may transmit HARQ-ACK feedback for each DCI only if resources for HARQ-ACK feedback indicated by each DCI are different. At this time, each HARQ-ACK feedback may be directed to the code block groups indicated by each DCI. In the same manner as the HARQ-ACK feedback transmitted later, a specific HARQ-ACK feedback may be HARQ-ACK for the code block groups scheduled from the plurality of DCIs.

On the other hand, the UE may transmit only HARQ-ACK feedback for specific DCI. In this case, the HARQ-ACK feedback may be HARQ-ACK feedback for the code block groups corresponding to the specific DCI or the code block groups corresponding to the plurality of DCIs. In detail, HARQ-ACK mapping order for the plurality of code block groups may be determined based on 1) a code block index within a specific transport block, 2) a temporal order of each DCI, or 3) the lowest code block group index indicated by each DCI.

In another aspect, the UE may transmit only HARQ-ACK feedback for specific DCI if all or some of HARQ-ACK feedback resources indicated by the plurality of DCIs for one transport block are overlapped. In this case, the HARQ-ACK feedback may be HARQ-ACK feedback for the code block groups corresponding to the specific DCI or the code block groups corresponding to the plurality of DCIs. In detail, HARQ-ACK mapping order for the plurality of code block groups may be determined based on 1) a code block index within a specific transport block, 2) a temporal order of each DCI, or 3) the lowest code block group index indicated by each DCI.

If specific resources of eMBB transmission or slot based transmission are punctured by URLLC, throughput degradation may occur in a code block for a plurality of layers mapped into the specific resources. If movement between layers for specific code blocks are not allowed during retransmission, to successfully decode the code block corresponding to the punctured resources, transmission equivalent to the corresponding layer may be required even in case of retransmission.

However, in the 5G NewRAT, a retransmission method of a level of a single code block or a plurality of code blocks may be introduced, and to avoid the inefficient status, code blocks corresponding to their respective layers different from each other during retransmission may be transmitted based on the same layer, the same transport block or the same codeword. For example, supposing that a code block #a of a layer #A and a code block #b of a layer #B are punctured by URLLC during eMBB transmission, the code block #a and the code block #b may be retransmitted through the same layer during retransmission. At this time, the same layer used for retransmission may be selected based on a channel state of each layer. That is, the layer used for retransmission may be the layer having the best channel state among the plurality of layers. Also, in the aforementioned case, the code blocks for retransmission may be transmitted through at least one transport block or codeword, whereby it is advantageous in that the other transport blocks or codewords may schedule another retransmission or new transmission.

If some of PDSCH resources transmitted from the base station to the UE are punctured, the existing method for again retransmitting all the code blocks included in the PDSCH may be used. At this time, if there is indication for puncturing or HARQ buffer discard indication, HARQ buffer for all CBs may be discarded, or all CBs may be assumed to be impacted by puncturing.

On the other hand, if some of PDSCH resources transmitted from the base station to the UE are punctured, only the code blocks impacted by puncturing may be retransmitted, or CB level retransmission or mini-slot level retransmission for retransmitting code blocks to which NACK is transmitted may be performed.

In case of code block level retransmission, code blocks to which NACK is transmitted or code blocks impacted by puncturing are retransmitted. Meanwhile, in case of mini-slot level retransmission, mini-slots including code blocks to which NACK is transmitted or mini-slots impacted by puncturing may be retransmitted. If retransmission of data impacted by puncturing is performed without HARQ-ACK feedback, it is preferable that mini-slot level retransmission is performed.

In the 5G NewRAT, retransmission based on a code block group may be introduced, and in at least DCI structure and analysis method, DCI for code block group based scheduling may be different from DCI for transport block based scheduling.

Meanwhile, if code block group based retransmission is configured, DCI may always include transport block based scheduling information and code block group based scheduling information. However, in this case, since excessive DCI overhead may occur, the UE may monitor DCI for code block group based retransmission at only a specific time. A detailed embodiment of a specific time for monitoring code block group based scheduling DCI is as follows.

1. Embodiment 1

After the UE transmits code block group based HARQ-ACK feedback, or if a certain number of code block groups in the code block group based HARQ-ACK feedback are NACK, that is, if at least one code block group is NACK or code block groups which are NACK are a certain level or less, the UE may perform DCI monitoring for code block group based scheduling from the time when HARQ-ACK feedback is transmitted or from the time when a specific time passes. This is because that it may be more efficient to perform transport block based retransmission through monitoring of DCI for transport block based scheduling if the code block groups which are NACK are a certain level or more. In this case, the specific time may be set through DCI or a higher layer.

However, since the UE may still assume that transport block based scheduling DCI for another HARQ process will be transmitted, a search space (SS), RNTI and CRC masking, blind detection (BD) attempts, etc. may be identified between code block group based DCI and transport block based DCI. For example, if the number of blind detection attempts for transport block based DCI is N and transport block based DCI should be monitored together with code block group based DCI, the number of blind detection attempts for transport block based DCI may be smaller than N. At this time, a value of N may be indicated by the base station through DCI or higher layer signaling.

Basically, considering asynchronous HARQ process, since it may be inefficient to continue to monitor code block group based DCI, a specific duration for monitoring code block group based DCI may be set. At this time, the specific duration may be set by the base station through higher layer signaling.

2. Embodiment 2

A third signal such as an indication signal for impacted resources impacted by puncturing may be transmitted before HARQ-ACK feedback for PDSCH including the impacted resources is transmitted. If the UE detects the indication signal or the detected indication signal indicates specific code block groups or specific time/frequency resources, the UE may receive the indication signal or perform DCI monitoring for code block group based scheduling from the detected time or the time when a specific time passes. In this case, the specific time may be set by DCI or higher layer signaling.

However, since the UE may still assume that transport block based scheduling DCI for another HARQ process will be transmitted, a search space (SS), RNTI and CRC masking, blind detection (BD) attempts, etc. may be identified between code block group based DCI and transport block based DCI. For example, the UE may not perform monitoring of code block group based DCI from the time when HARQ-ACK feedback for a specific PDSCH is transmitted or from a previous slot of the corresponding time or next slot of the corresponding time. In detail, if the indication signal is not transmitted through a separate signal, the UE may perform code block group based DCI monitoring after a slot when PDSCH is transmitted if code block group based transmission is configured by a higher layer, or from the slot when PDSCH is transmitted to the slot when HARQ-ACK feedback corresponding to the PDSCH transmission is transmitted or the previous slot.

3. Embodiment 3

CORESET (control resource set), a search space, blind detection attempts, etc. for transport block based DCI and code block group based DCI may be identified, or may be configured separately. For example, CORESET for code block group based DCI may be configured in a PDSCH region such as the last several symbols or mini-slots of a region into which PDSCH is mapped. In this case, since the case that all resources that can be configured as CORESET for code block group based DCI are always reserved may be inefficient in view of PDSCH transmission, PDSCH mapping may be varied depending on CORESET transmission.

For example, if DCI is successfully detected from CORESET for code block group based DCI, the UE may perform rate matching or puncturing without PDSCH mapping for resources or a resource unit into which the detected DCI is mapped, and PDSCH mapping may be performed in the other resources.

Any one of the aforementioned embodiments may be used, and a code block group based monitoring duration may be set by combination of the embodiments.

RE Mapping Change for Potential Multiplexing with URLLC Signal

Frequency resource allocation for URLLC may not be excessive depending on traffic. Also, a physical channel for URLLC transmission may have a variety of transmission bandwidth sizes, and puncturing may be performed in only a frequency domain of eMBB transmission. If the amount reserved by punctured resources is small, throughput degradation for eMBB may be small depending on eMBB scheduling information such as transport block size and/or code rate.

However, even in the case that the punctured resources are small, throughput degradation caused by puncturing may be great if puncturing is performed for systematic bits during eMBB transmission. Therefore, it is required to avoid systematic bits if possible in puncturing eMBB transport resources through URLLC traffic. Meanwhile, in the present invention, although a description is given based on systematic bits for convenience of description, other main signal or information such as UCI or DCI is applicable from the spirits of the present invention.

Basically, a coded symbol for systematic bits and parity bits may include an interleaver of a certain pattern, and may be mapped into actual RE in accordance with a mapping order. If the pattern and the order are fixed, URLLC transmission performed while avoiding important information such as systematic bits in a state that eMBB is transmitted may reduce scheduling flexibility.

Therefore, the interleaver pattern and/or RE mapping order may independently be configured in a slot level, a code block level, a code block group level or a mini-slot level. At this time, DCI for scheduling PDSCH may indicate a type of the level, the interleaver pattern, and the RE mapping order. For example, considering that the coded symbol is first mapped into a frequency axis and mapping method is performed while increasing a symbol index, mapping may be performed in a specific code block or a specific symbol in an ascending order of frequency indexes, and mapping may be performed in another specific code block or symbol in a descending order of frequency indexes. Through this method, it is possible to attenuate throughput degradation for eMBB while making sure of scheduling flexibility for URLLC transmission if possible.

Although the embodiment of the present invention has been described based on a DL channel, it will be apparent that the embodiment is also applicable to UL channel in the form of transmission where mini-slot based communication such as URLLC is performed while puncturing some resources of slot based communication such as eMBB.

HARQ-ACK Code Block Level Feedback or Mini-Slot Level Feedback

In the indication method and retransmission methods described in the aforementioned embodiments, the UE may perform HARQ-ACK feedback in a code block level or a transport block level. If the UE performs HARQ-ACK feedback in a code block level, the operations of the aforementioned embodiments may be more obvious.

The UE may transmit A/N of each of a code block level or multiple code blocks. The UE may configure whether to perform A/N transmission in a transport block level, a code block level or a level of multiple code blocks semi-statically or dynamically.

If the A/N transmission is performed to be configured dynamically, the UE may dynamically designate activation/deactivation as to an operation of a corresponding mode similarly to an A/N resource indication method. Also, if transport blocks transmitted through each slot or mini-slot are mapped into the same A/N resource, that is, if PUCCH resources are the same as one another or PUSCHs to be subjected to piggyback are the same as one another during PUSCH piggyback, it may be assumed that at least the same mode is used.

Also, the aforementioned mode may differently be applied to each transport block. In this case, when A/N bits are calculated, A/N bits for code blocks to be transmitted may be added to A/N bits for transport block. The A/N bits for code blocks and the A/N bits for transport block may be detached from stacking. That is, the A/N bits for code blocks may first be stacked and then the A/N bits for transport block may be stacked, or vice versa.

If the network receives A/N bits for each of the code blocks or the multiple code blocks, the network may perform retransmission for only the code blocks which have received NACK. Information on code blocks which are retransmitted may dynamically be notified considering ACK-to-NACK or NACK-to-ACK error, and the number of the code blocks may be included in the information on the code blocks. If the number of the code blocks re-received by the UE is not matched with the number of the code blocks which have transmitted NACK, the UE may drop corresponding retransmission and retransmit NACKs.

Meanwhile, in case of the code blocks which are retransmitted, the code blocks impacted by puncturing and the code blocks which are not impacted by puncturing exist for each code block. In case of the code blocks impacted by puncturing, indication on the code blocks impacted by puncturing may be required. In this case, whether the code blocks which are retransmitted are impacted by puncturing may be indicated. In this case, all code blocks which are retransmitted may equally be indicated to discard a previous HARQ buffer. This indication may include implicit indication or explicit indication using RV, NDI, etc.

Figure 10:
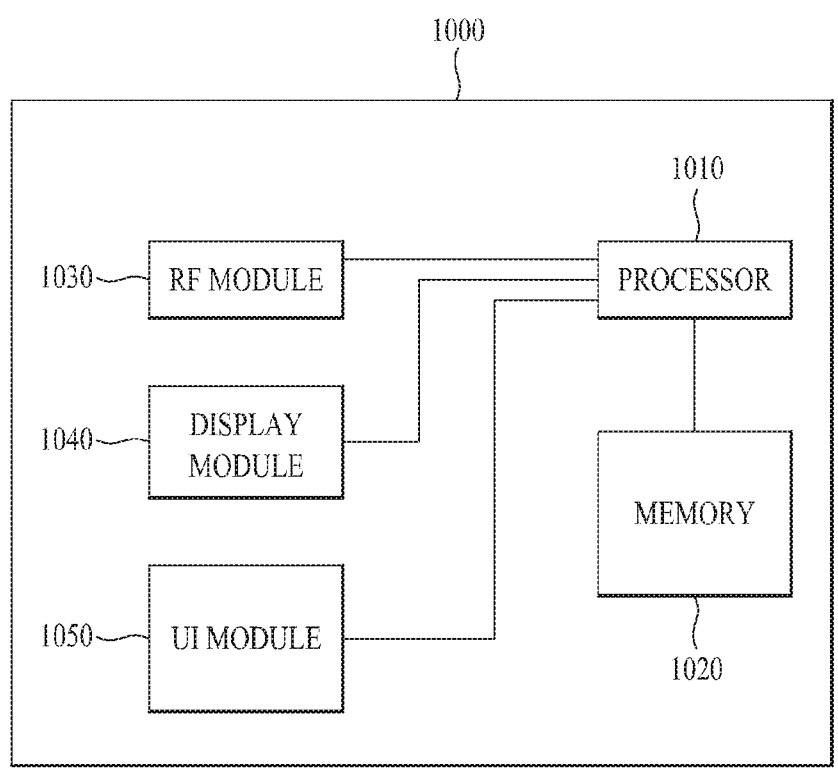
FIG. 10 is a block diagram of a communication apparatus according to an embodiment of the present invention.

FIG. 10 is a block diagram of a communication apparatus according to an embodiment of the present invention. Referring to FIG. 10, a communication apparatus 1000 includes a processor 1010, a memory 1020, a Radio Frequency (RF) module 1030, a display module 1040 and a user interface module 1050.

The communication apparatus 1000 is shown for convenience of description and some modules thereof may be omitted. In addition, the communication apparatus 1000 may further include necessary modules. In addition, some modules of the communication apparatus 1000 may be subdivided. The processor 1010 is configured to perform an operation of the embodiment of the present invention described with respect to the drawings. For a detailed description of the operation of the processor 1010, reference may be made to the description associated with FIGS. 1 to 9.

The memory 1020 is connected to the processor 1010 so as to store an operating system, an application, program code, data and the like. The RF module 1030 is connected to the processor 1010 so as to perform a function for converting a baseband signal into a radio signal or converting a radio signal into a baseband signal. The RF module 1030 performs analog conversion, amplification, filtering and frequency up-conversion or inverse processes thereof. The display module 1040 is connected to the processor 1010 so as to display a variety of information. As the display module 1040, although not limited thereto, a well-known device such as a Liquid Crystal Display (LCD), a Light Emitting Diode (LED), or an Organic Light Emitting Diode (OLED) may be used. The user interface module 1050 is connected to the processor 1010 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a mobile station can be performed by a base station or other networks except the base station. Herein, a base station may be substituted with such a terminology as a fixed station, a Node B, an eNode B (eNB), an access point (AP) or the like.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the retransmission method of punctured data and the device therefor in the above-described wireless communication have been described based on examples in which the method and the device are applied to 5G NewRAT, the method and the device are applicable to various wireless communication systems in addition to 5G NewRAT.

The invention claimed is:

1. A method for receiving data in a user equipment (UE) through a plurality of layers of a base station in a wireless communication system, the method comprising:
    receiving, from the base station, the data, which are divided into a plurality of first code blocks, and a specific downlink control indicator (DCI) for the data; and
    receiving, from the base station, a plurality of second code blocks based on the specific DCI,
    wherein all of the plurality of second code blocks are received through a same layer,
    wherein the plurality of second code blocks are received based on response signals to each of the plurality of first code blocks transmitted based on the specific DCI,
    wherein the plurality of second code blocks are related to the plurality of first code blocks having Negative Acknowledgement (NACK) as a response signal,
    wherein whether a first DCI including code block based scheduling information or a second DCI including transport block based scheduling information is monitored is configured based on a number of response signals having NACK among the response signals to each of the plurality of first code blocks,
    wherein the first DCI is monitored when the number of the response signals having NACK is equal to or smaller than a threshold value and the second DCI is monitored when the number of the response signals having NACK is greater than the threshold value, and
    wherein a first search space configured for monitoring the first DCI is different from a second search space configured for monitoring the second DCI.

2. The method of claim 1, wherein the same layer is selected based on a channel state of each of the plurality of layers.

3. The method of claim 1, wherein the specific DCI includes puncturing information of a specific time domain, and the plurality of second code blocks correspond to at least one first code block of which at least a portion is included in the specific time domain.

4. The method of claim 3, wherein the puncturing information of the specific time domain includes a start position and time duration information, which are punctured, of the specific time domain.

5. The method of claim 3, wherein the data are decoded based on only the plurality of second code blocks.

6. The method of claim 1, wherein data different from the data are received through the other layers except the same data among the plurality of layers.

7. The method of claim 1, wherein the plurality of first code blocks are received in a transport block level including at least one of the plurality of first code blocks.

8. The method of claim 1, wherein values of redundancy versions of each of the plurality of first code blocks and each of the plurality of second code blocks are set independently from each other.

9. The method of claim 1, wherein the plurality of first code blocks and the plurality of second code blocks are related to same data.

10. A user equipment (UE) for receiving data through a plurality of layers of a base station in a wireless communication system, the UE comprising:
    a radio frequency (RF) module for transmitting and receiving signals to and from the base station; and
    a processor connected with the RF module, receiving the data, which are divided into a plurality of first code blocks, and a specific downlink control indicator (DCI) for the data, and receiving a plurality of second code blocks based on the specific DCI,
    wherein all of the plurality of second code blocks are received through a same layer,
    wherein the plurality of second code blocks are received based on response signals to each of the plurality of first code blocks transmitted based on the specific DCI,
    wherein the plurality of second code blocks are related to the plurality of first code blocks having Negative Acknowledgement (NACK) as a response signal,
    wherein whether a first DCI including code block based scheduling information or a second DCI including transport block based scheduling information is monitored is configured based on a number of response signals having NACK among the response signals to each of the plurality of first code blocks,
    wherein the first DCI is monitored when the number of the response signals having NACK is equal to or smaller than a threshold value and the second DCI is monitored when the number of the response signals having NACK is greater than the threshold value, and
    wherein a first search space configured for monitoring the first DCI is different from a second search space configured for monitoring the second DCI.

11. The UE of claim 10, wherein the same layer is selected based on a channel state of each of the plurality of layers.

12. The UE of claim 10, wherein values of redundancy versions of each of the plurality of first code blocks and each of the plurality of second code blocks are set independently from each other.

13. The UE of claim 10, wherein the specific DCI includes puncturing information of a specific time domain, and the plurality of second code blocks correspond to at least one first code block of which at least a portion is included in the specific time domain.

* * * * *